No. 722,265. PATENTED MAR. 10, 1903.
B. P. SWYERS.
SHEAR TABLE.
APPLICATION FILED SEPT. 16, 1902.
NO MODEL. 3 SHEETS—SHEET 1.
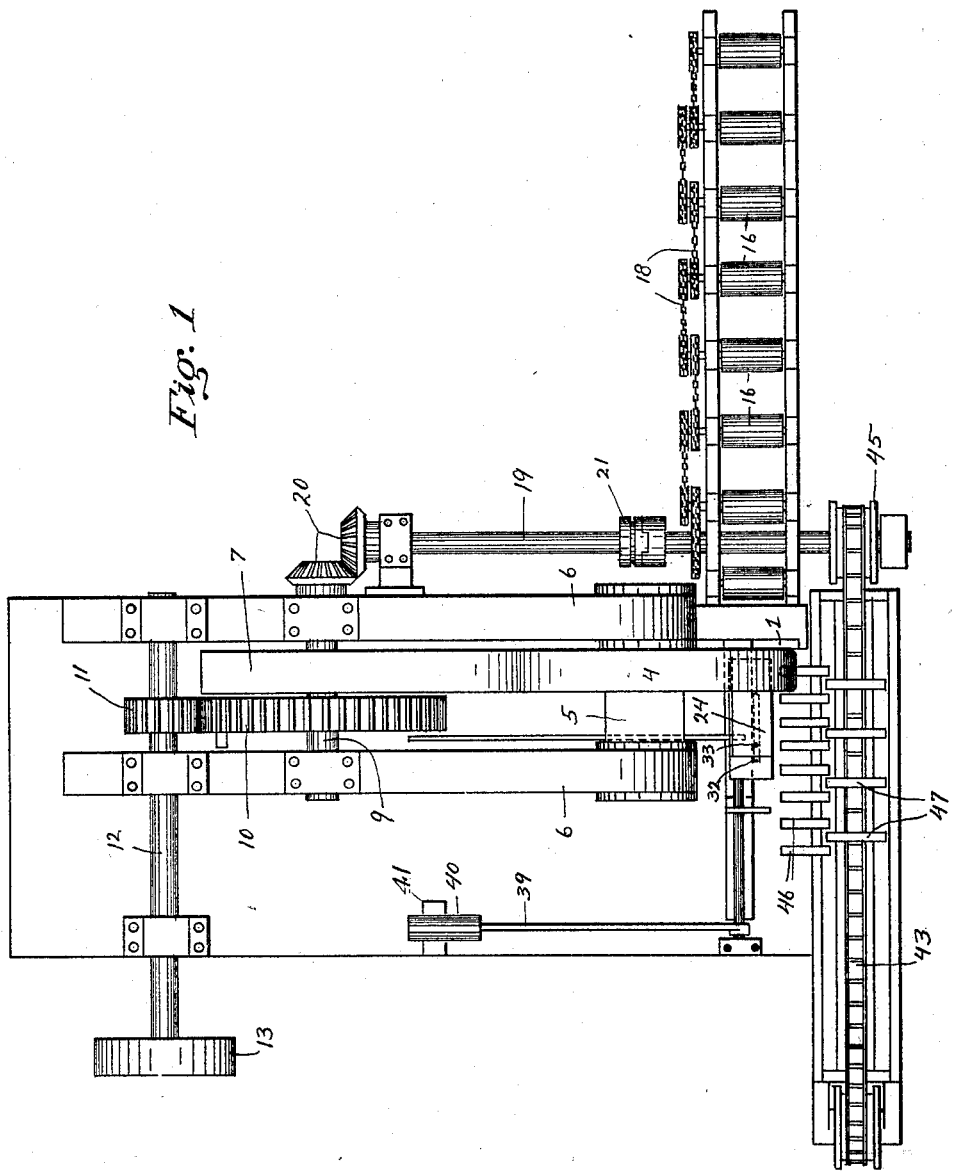

No. 722,265. PATENTED MAR. 10, 1903.
B. P. SWYERS.
SHEAR TABLE.
APPLICATION FILED SEPT. 16, 1902.
NO MODEL. 3 SHEETS—SHEET 2.
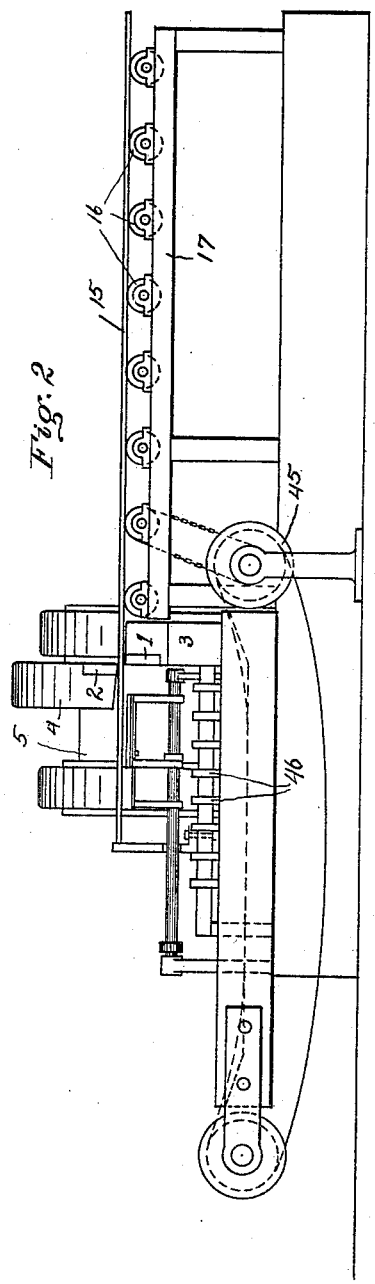
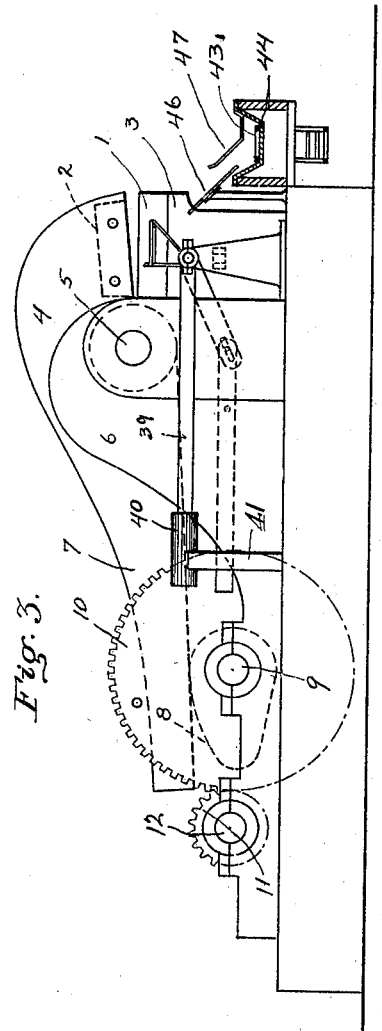
Witnesses.
Fred D. Sweet.
Leonard C. Herbst.
Inventor.
Price P. Swyers
By Kay & Totten
Attorneys.

No. 722,265.

PATENTED MAR. 10, 1903.

B. P. SWYERS.
SHEAR TABLE.
APPLICATION FILED SEPT. 16, 1902.

NO MODEL.

3 SHEETS—SHEET 3.

Witnesses.
Fred D. Sweet
Leonard C. Hoyt

Inventor.
Brice P. Swyers
By Kay & Totten
Attorneys.

UNITED STATES PATENT OFFICE.

BRICE P. SWYERS, OF PITTSBURG, PENNSYLVANIA.

SHEAR-TABLE.

SPECIFICATION forming part of Letters Patent No. 722,265, dated March 10, 1903.

Application filed September 16, 1902. Serial No. 123,581. (No model.)

*To all whom it may concern:*

Be it known that I, BRICE P. SWYERS, a resident of Pittsburg, in the county of Allegheny and State of Pennsylvania, have invented a new and useful Improvement in Shear-Tables; and I do hereby declare the following to be a full, clear, and exact description thereof.

My invention relates to metal-shears, and more especially to shears for cutting long plates into sheet-bars, although it is adapted for shearing plates, sheets, or bars of any description and also is adapted as a blooming-mill shears.

The object of my invention is to provide means for receiving the cut-off piece from the shears and delivering the same from the machine, which means also acts as a support for the projecting end of the plate, sheet, or bar, especially if the latter is thin and flexible.

Figure 4:
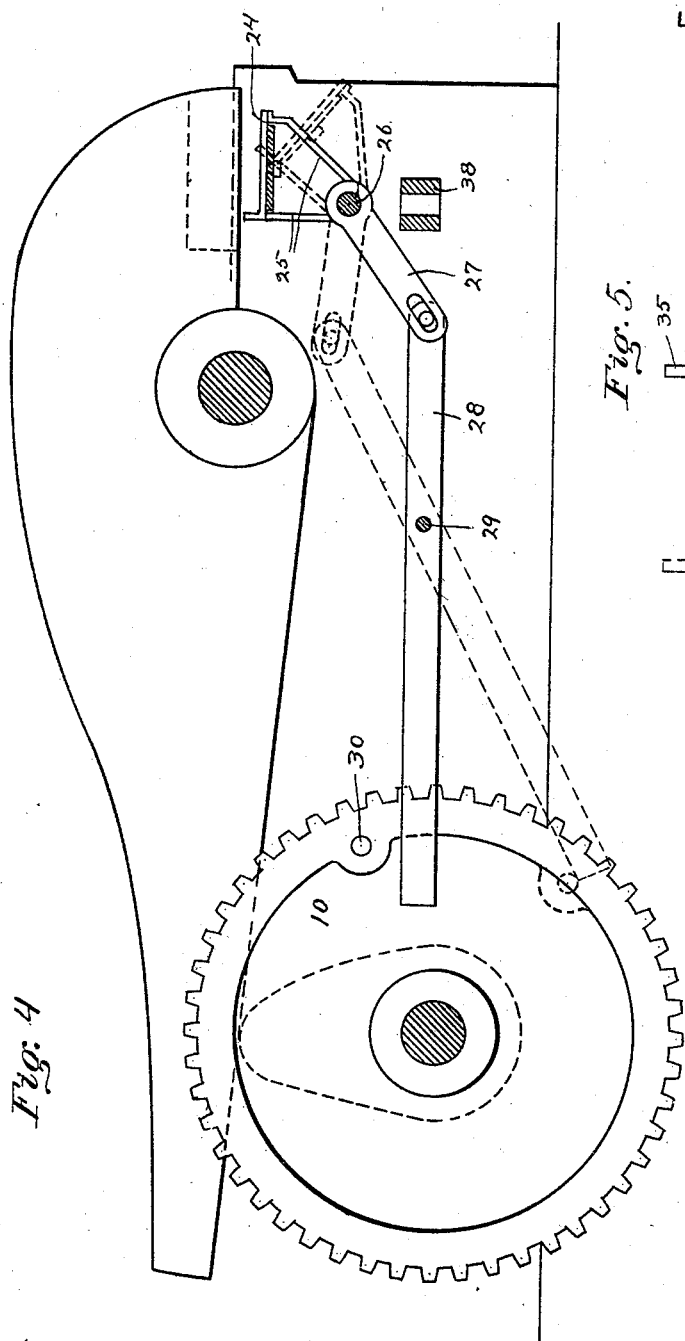
Figure 5:
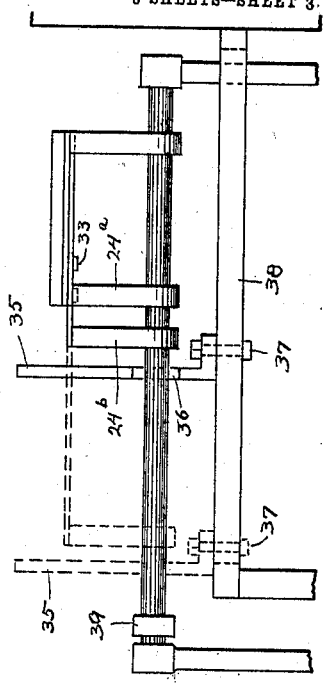

In the accompanying drawings, Figure 1 is a plan view of my machine. Fig. 2 is a front elevation thereof. Fig. 3 is an end view thereof, the conveyer-trough being shown in section. Fig. 4 is a transverse vertical section of the machine on an enlarged scale; and Fig. 5 is a front elevation of the rocking table, also on an enlarged scale.

The shear-blades may be of any desired construction and operate in any desired way, those shown in the drawings comprising a stationary lower blade 1 and an oscillating upper blade 2, coöperating with the blade 1. The blade 1 is mounted on a suitable base or frame 3, and the blade 2 is mounted on the outer end of an oscillating lever 4, trunnioned at 5 in the housings 6, and provided with a rearwardly-extending arm or tail 7, which lies above a cam 8 on the shaft 9. The latter may be rotated in any suitable way—such, for instance, as by the gears 10 and 11—the latter being mounted upon the power-driven shaft 12, provided with a driving-pulley 13. By the rotation of the shaft 9 it will be obvious that the cam 8 will elevate the tail 7 of the lever 4, thus rocking said lever about its trunnions and causing the blade 2 to shear off the metal bar or plate. The bar or plate is shown at 15, and it may be fed to the shear in any suitable manner. I have shown for this purpose a series of live rollers 16, suitably mounted in a table 17, and they may be driven by any suitable mechanism, that illustrated comprising sprocket-chains 18, connecting suitable sprocket-wheels on the live rollers, and the first of said rollers being driven by a similar chain from the countershaft 19, which is shown as driven from the shaft 9 by means of a pair of bevel-gears 20. A suitable clutch 21 is provided on the shaft 19, so that if necessary or desired the feed-rollers 16 can be stopped and the forward feed of the bar or plate arrested.

In advance of the shear-blades I provide my improved support and delivery device, the same comprising a normally horizontal table 24, provided with brackets 25, which are secured to a rock-shaft 26, mounted in suitable bearings on the frame of the machine. This table is mounted in such position that the bar or plate will be fed just above the same, and in case the bar or plate is very flexible it will sag down and be supported by said table. As soon as the projecting end is sheared off the table is rocked, as indicated in dotted lines, Fig. 4, to deliver the cut-off piece from the machine. The rocking of this table may be effected in any desired manner. I have shown for this purpose an arm 27, connected to the rock-shaft 26 and having a slotted connection with the forward end of a lever 28, pivoted at 29 to the frame of the machine and having its rear end lying in the path of a lug or projection 30 on the gear-wheel 10. It will be understood that for every rotation of the shaft 9 the cam 8 will operate the movable shear-blade 2, and the lug 30 will through the lever 28 tilt the table 24. Thus the table is tilted in unison with the operation of the shears, and the lug 30 will bear such a relation to the cam 8 that the table 24 will be tilted just after the shear-blade 2 has completed its downward stroke.

The table 24 I preferably construct in sections 24$^a$ and 24$^b$, one of which sections—as, for instance, 24$^b$—has its table portion provided with a slot 32, which rides over a headed bolt 33, secured to the other table-section. The bracket 25 of the section 24$^b$ is slidably mounted on the rock-shaft 26, while the brackets of the other section are preferably fixed thereto. By this construction the table can be lengthened or shortened as desired to accommodate it to pieces of various lengths.

A suitable stop or gage 35 is located at the outer end of the table 24 in position to have the projecting end of the bar or plate contact therewith. This gage 35 is shown as an upright bar cut out or bent, as at 36, to pass the shaft 26 and being secured, by means of a bolt 37, to a slotted bar or support 38 underneath the shaft 26. By means of the bolt 37 and slotted bar 38 the gage can be adjusted forward and back, as indicated in Fig. 5.

To return the table 24 to its normal or horizontal position after being tilted, I provide any suitable counterbalance, such as an arm 39, secured to the rock-shaft 26 and provided at its rear end with a counterweight 40. A suitable stop 41 is provided in the path of this counterweight, so as to stop the table when it reaches its horizontal position. Any other suitable counterbalance, however, such as a spring or the like, may be used.

Just in front of and somewhat below the rocking table 24 is a delivery-conveyer 43, this conveyer being shown as an ordinary chain conveyer running in a trough 44 and driven in any suitable way—such, for instance, as from the sprocket-wheel 45 on the end of the counter-shaft 19. A series of inclined guides or skids 46 are provided, upon which the cut-off portion of the plate or bar falls when the table 24 is tilted and which direct the cut-off piece onto the conveyer 43. A series of guide-fingers 47 are secured to the trough 44 and project slightly above the lower end of the guides 46. These insure the cut-off pieces being guided onto the conveyer 43.

The operation of my machine will be gathered from the foregoing description and is as follows: Power being applied to the shaft 12, the shaft 9 will be rotated and through the bevel-gears 20, shaft 19, and sprocket wheels and chains will communicate motion to the live rollers 16 and also to the conveyer 43. The rollers 16 will feed the plate, sheet, or bar over the stationary shear and over the table 24 until the end strikes the gage 35, when the forward motion of the plate or bar will cease. In the meantime the rotation of the shaft 9 is bringing the cam 8 underneath the tail of the lever 4, and also the projection 30 is being moved toward the lever 28. The cam 8 is set relatively somewhat in advance of the projection 30, and at the proper time the movable blade 2 is depressed to shear off the projecting end of the plate or bar, the latter dropping down upon the table 24 unless it is so flexible that it has already sagged down upon the same. Shortly thereafter the stop 30 comes into contact with the lever 28, and this, through the arm 27, rocks the table 24, thus permitting the cut-off portion to slide down the guides 46 onto the conveyer 43. As soon as the projection 30 has passed the end of the lever 28 the counterbalance 40 will return the table 24 to its upright position, and as soon as the shear-blade 2 has been raised up out of the way the live rollers 16 will again feed forward the plate or bar until it strikes the gage 35, and the foregoing operations will be repeated. No attendant is necessary in order to feed forward the bar or to remove the cut-off pieces from the machine, and a single workman is sufficient for running the entire machine.

What I claim as my invention, and desire to secure by Letters Patent, is—

1. In a metal-shear, the combination with the shear-blades and mechanism for operating them, of means for feeding a sheet, plate, bar or the like to said shear-blades, a normally horizontal rocking table adjacent to said shear-blades upon which the cut-off portion falls, and mechanism for tilting said table to deliver the cut-off piece from the machine.

2. In a metal-shear, the combination with a pair of continuously-operating shear-blades, of means for feeding a sheet, plate, bar, or the like to said blades, a normally horizontal rocking table adjacent to said blades upon which the cut-off piece falls, and mechanism for tilting said table to deliver the cut-off piece from the machine.

3. In a metal-shear, the combination with the shear-blades and mechanism for operating them, of means for feeding a sheet, plate, bar, or the like to said shear-blades, a normally horizontal rocking table adjacent to said shear-blades over which the cut-off end projects, and connections between the shear-operating mechanism and the table for tilting the latter to deliver the cut-off piece from the machine.

4. In a metal-shear, the combination with the shear-blades, of a rotating shaft provided with a cam for operating said blades, means for feeding a sheet, plate, bar, or the like to said blades, a rocking table adjacent to said blades, a lever connected to said table, and a projecting portion carried by the rotating shaft for engaging said lever to tilt the table.

5. In a metal-shear, the combination with the shear-blades and mechanism for operating them, of means for feeding a sheet, plate or bar to said shear-blades, a rocking table adjacent to said shear-blades, mechanism for tilting said table to deliver the cut-off piece from the machine, and a counterbalance for returning said table to its upright position.

6. In a metal-shear, the combination with the shear-blades and mechanism for operating them, of means for feeding a sheet, plate or bar to said shear-blades, a rocking table adjacent to said shear-blades, said table comprising two sections adjustable with relation to each other, and mechanism for tilting said table to deliver the cut-off piece from the machine.

7. In a metal-shear, the combination with the shear-blades and mechanism for operating them, of a table adjacent to said shear-blades, said table comprising two sections adjustable with reference to each other, brackets secured to said table-sections, a rock-shaft to which said brackets are secured, and mechanism for rocking said shaft to tilt said table.

8. In a metal-shear, the combination with the shear-blades and mechanism for operating them, of a table adjacent to said shear-blades in position to receive the cut-off portion of metal, said table comprising two sections having a slot-and-pin connection with each other, brackets secured to both of said table-sections, a rock-shaft to which the brackets of one of said sections are fixed and upon which the bracket of the other section is slidably mounted, and mechanism for rocking said shaft to tilt said table.

9. In a metal-shear, the combination with the shear-blades and mechanism for operating them, of a rocking table adjacent to said shear-blades in position to receive the cut-off piece of metal, mechanism for tilting said table, and a conveyer located in position to receive the cut-off piece from said table.

10. In a metal-shear, the combination with the shear-blades and mechanism for operating them, of a tilting table adjacent to said blades in position to receive the cut-off piece, mechanism for tilting said table, a conveyer in position to receive the cut-off piece from said table, and inclined guides between said table and conveyer for guiding the cut-off piece onto the conveyer.

In testimony whereof I, the said BRICE P. SWYERS, have hereunto set my hand.

BRICE P. SWYERS.

Witnesses:
   ROBT. D. TOTTEN,
   ROBERT C. TOTTEN.